US007289584B2

(12) United States Patent
Eller et al.

(10) Patent No.: US 7,289,584 B2
(45) Date of Patent: Oct. 30, 2007

(54) PREDICTIVE MULTI-CHANNEL DECODER

(75) Inventors: Jerry Eller, Placitas, NM (US); Bob Tiernay, Albuquerque, NM (US); Gerald Gibbs, Albuquerque, NM (US)

(73) Assignee: TC License Ltd., Hummelstown, PA (US)

( * ) Notice: Subject to any disclaimer, the term of this patent is extended or adjusted under 35 U.S.C. 154(b) by 834 days.

(21) Appl. No.: 10/460,401

(22) Filed: Jun. 13, 2003

(65) Prior Publication Data

US 2004/0254788 A1 Dec. 16, 2004

(51) Int. Cl.
*H04B 7/10* (2006.01)

(52) U.S. Cl. ...................................................... 375/347

(58) Field of Classification Search ................ 375/267, 375/347, 349
See application file for complete search history.

(56) References Cited

U.S. PATENT DOCUMENTS 5,504,783 A * 4/1996 Tomisato et al. ........... 375/267
5,687,197 A * 11/1997 Powell et al. ............... 375/347
6,571,090 B1 * 5/2003 Moriyama et al. ....... 455/277.1

* cited by examiner

*Primary Examiner*—Kevin Kim
(74) *Attorney, Agent, or Firm*—Blank Rome LLP

(57) ABSTRACT

A method for decoding data from multiple channels by predicting future symbol periods is disclosed. The method includes the steps of receiving data symbols on two channels, detecting data symbol level transitions for each channel, predicting a future symbol level transition, verifying the validity of data symbols on each channel, and selecting the best data symbol from one of the two channels.

12 Claims, 3 Drawing Sheets

PREDICTIVE MULTI-CHANNEL DECODER

BACKGROUND OF THE INVENTION

1. Field of the Invention

The present invention relates to communication receivers. More specifically, the present invention is directed to multi-channel predictive decoding in a communication receiver.

2. Description of the Prior Art

Radio frequency ("RF") homodyne receivers are used in RF identification ("RFID") systems. RFID systems may be used, for example, to identify a vehicle passing through a toll lane to charge a toll fee to a corresponding account.

In addition to the receiver, an RFID system includes an RF source and a transponder tag associated with a target to be identified (e.g., a vehicle). The source transmits an RF signal that reaches the tag. The tag backscatter-modulates the signal, which is then received by the RF homodyne receiver. Backscatter modulation may be defined as the alteration of a tag's radar cross section with time.

The RF homodyne receiver mixes the backscattered signal with a local oscillator ("LO") signal to produce intermediate frequency ("IF") signals. The IF signals are then amplified and decoded to obtain identification data.

One of the major problems encountered with RFID systems is that to produce a measurable IF signal, the backscattered signal should preferably be in phase with the LO signal. Mathematically, if the LO and the RF signals received are cosine waves, the signals mix (e.g., are multiplied with each other) and can be expressed as a square cosine IF signal. But if the received RF signal is 90 degrees out of phase with the LO signal, the resulting signal is a cosine multiplied by a sine, which results in an IF signal having zero magnitude.

A first solution to the problem involves three-channel phase detection. In this approach, three different phases of the backscattered signal mix with the LO signal to produce IF signals. The receiver amplifies, filters, and digitizes the IF signals. The digitized IF signals are then sent to a decoder where information is extracted by selecting the two channels that have the same decoded data. The major problem with a two-channel decoder is trying to decide which of the two channels is correct. With the three-channel decoder only one channel can be out of phase at a time, and when two out of the three channels (phases) being received are in agreement, the correct data can be deciphered. The three-channel decoder however requires filtering and amplification of three independent channels, which takes up receiver space. In addition, the reception depends on the least sensitive of the two selected channels.

A second solution to the in-phase problem is similar to the three-channel phase detection approach discussed above. The difference lies in the use of a quasi-third channel. RF mixing occurs at four phase angles: 0 degrees (A+), 90 degrees (B+), 180 degrees (A−), and 270 degrees (B−). A channel "A" is processed as (A+)-(A−); a channel B is processed as (B+)-(B−); and the quasi-third channel is processed as (A+)-(B−). The quasi-third channel approach requires processing of three channels and two-out-of-three voting, which results in a significant decrease in the signal-to-noise ratio.

A third solution to the in-phase problem, which may be used with only two channels, is to correlate known symbols of choice with symbols received on each of two channels 90 degrees apart. The channel with the greatest correlation to a known symbol is then selected for decoding. Correlation works well when the exact periods of the incoming data symbols are known.

In RFID systems the tags are designed for low cost, and therefore, the period of the received symbols can vary by as much as 20%.

Not knowing the period (or length) of the incoming signal makes it very difficult to determine the period (or length) of the incoming signal utilizing correlation. This task becomes even more difficult when trying to choose between two channels.

A fourth approach for solving the in-phase problem is to distinguish a bad channel from a good one by selecting the signal with the greatest power. This is the technique normally utilized in sampled systems. For systems where amplitude information has been reduced to either ON or OFF, state power measurements are not available. This invention provides an advantage in systems where only binary transitions and their occurrence in time are available, including cases where the power levels of two incoming signals are not known.

The present invention as described in the sections that follow provides solutions to the problems discussed above.

SUMMARY AND OBJECTS OF THE INVENTION

A first object of the present invention is to provide a decoder with a sensitivity higher than prior art decoders.

A second object of the present invention is to reduce the number of channels needed for efficiently decoding backscattered signals.

A third object of the present invention is to create a quasi-channel to predict the characteristics of a next received bit or symbol.

A fourth object of the present invention is to decode signals while discarding amplitude information from the received signal.

A fifth object of the present invention is to decode signals by observing and recording level transitions.

A sixth object of the present invention is to eliminate the multiple processing of the received signal to account for phase inversions in the incoming data.

A seventh object of the present invention is to use least squares or minimum distance time pattern recognition for selecting the best incoming input data channel based on where level transitions are expected to occur.

These and other objects and features of the present invention are accomplished, as embodied and fully described herein according to the invention, by the decoding process discussed below.

The decoding process of the present invention may be applied to two digitized IF signals carrying data in a bi-phase format, each IF signal on a different channel. The decoding process includes the steps of detecting edges or level transitions for each channel; predicting future edges; verifying the validity of data symbols; and selecting the best of the two channels.

Predicting edges may include predicting the time period of a future pulse by using known periods of previous symbols. The symbol validity verification may be conducted by pattern matching the received symbols with known symbol patterns. Finally, the best channel selection is conducted by measuring the symbol period of each received valid symbol, comparing the measured period with a predicted period, and choosing the channel carrying the symbol with a symbol period closest to the predicted period.

With these and other objects, advantages and features of the invention that may become hereinafter apparent, the nature of the invention may be more clearly understood by reference to the following detailed description of the invention, the appended claims and the accompanying drawings.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
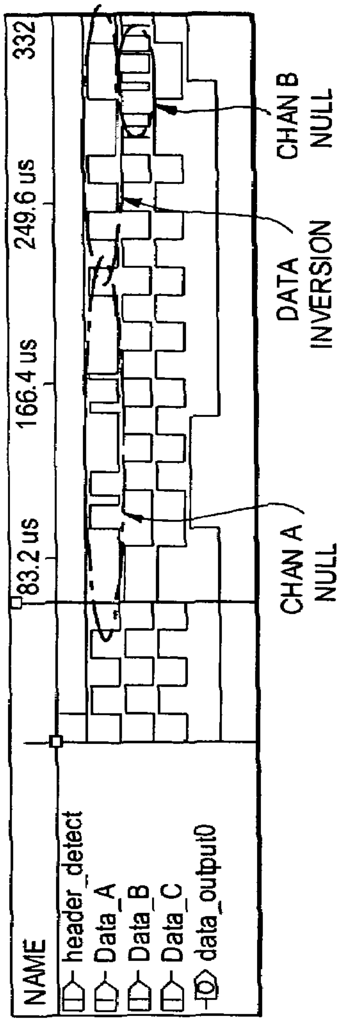
FIG. 1 illustrates differential bi-phase data received by a three-channel decoder.

FIG. 1 illustrates differential bi-phase data received by a three channel decoder. The first channel is labeled in the figure as "Data_A;" the second as "Data_B;" and the third as "Data_C." The data shown corresponds to the IF signal that may be produced by a receiver card and input to a decoder. When a tag approaches the RF receiver, the phase between the LO signal (e.g., cos ωt) mixes with the back-scattered signal (e.g., cos[ωt+Φ]). The RF receiver may be designed to achieve maximum sensitivity on the first channel where the phase shift of the backscatter signal (Φ) is zero in relation to the phase of the LO signal. The receiver may also be designed to achieve maximum sensitivity on the second channel when Φ is 120 degrees and on the third channel when Φ is 240 degrees.

FIG. 1 shows the first channel going into a null (Chan A null). That occurs when Φ is 90 degrees. At a later time, the second channel goes into a null (Chan B null) when Φ is 210 degrees. The decoder, which receives the data from the three channels, determines which of the three contains good information to decode the data from that channel.

The decoder of the present invention may be used with two or more channels. A novel feature of the decoder is that it may develop a quasi-third channel to "predict" what a next bit will look like. That prediction may be based on the data previously received.

Another novel feature is that the decoder may discard amplitude information from the received signal. Instead of using amplitude information to decode the data, the decoder may observe and record level transitions (or zero-crossings). Discarding amplitude information eliminates the requirement for multiple processing to account for phase inversions in the incoming data. It also allows viewing the data information in the single dimension of time.

A digital phase lock may be used to predict the time at which known edges occur and to actively adapt the tolerances accordingly. Frequency measurements in the data already received are used to select which of the incoming channels has the best data. A least squares or minimum distance time pattern recognition may be used to select the best incoming input data channel based on where the level transitions are expected to occur. The decoder selects as the good channel that channel having the minimum distance to the predicted symbol time pattern. Information from the good channel may be statistically weighted with stored data to predict what the next symbol should look like. The symbol prediction can be based on both the known and unknown characteristics of the received symbols. For example, differential bi-phase zero decoding may require an edge transition at the beginning and end of each received symbol. The location of the transition constitutes information known about the symbol. A zero may be indicated by a transition in the middle of the symbol and a 1 by the absence of a transition. It is not known if the transition will be there or not, and in fact, the transition contains the information as to what the value of the symbol is. The fact that at least one and no more than two edges are required within a certain period of time can be predicted and utilized to determine the validity of the symbol. By predicting where these edge transitions are expected to occur based upon symbols already received, a decision can be made as to which of two channels has the better data without knowing the power levels of the two signals.

The operation of the decoder of the present invention will be explained with bi-phase data as an example. The decoder of the present invention decodes data from the best available channel in several novel ways. The primary advantage being that there is no requirement to know the power levels of the two channels being compared. The determination of which of the two channels has the most reliable information can be made based upon timing considerations alone. Features of the invention include edge detection, edge prediction, valid symbol verification, and best channel selection. The features will be discussed with reference to FIGS. 2-8.

Figure 2:
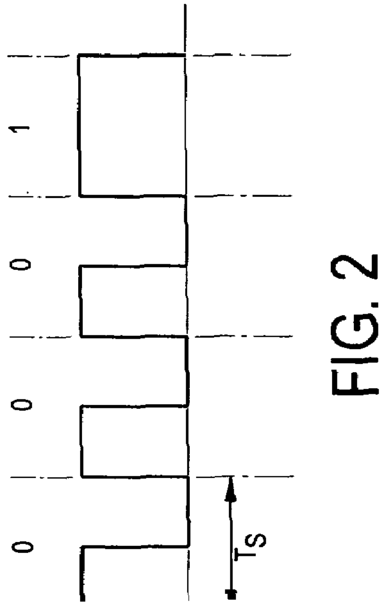
FIG. 2 illustrates a sequence of bi-phase data on a single channel.

FIG. 2 illustrates a sequence of bi-phase data on a single channel. In the figure, bi-phase low data has two symbol types. A low or "zero" is indicated by a phase transition at the mid point of a symbol period. A "one" is indicated by no transition or single phase during a symbol period. The data in FIG. 2 shows a sequence of 0001.

Figure 3:
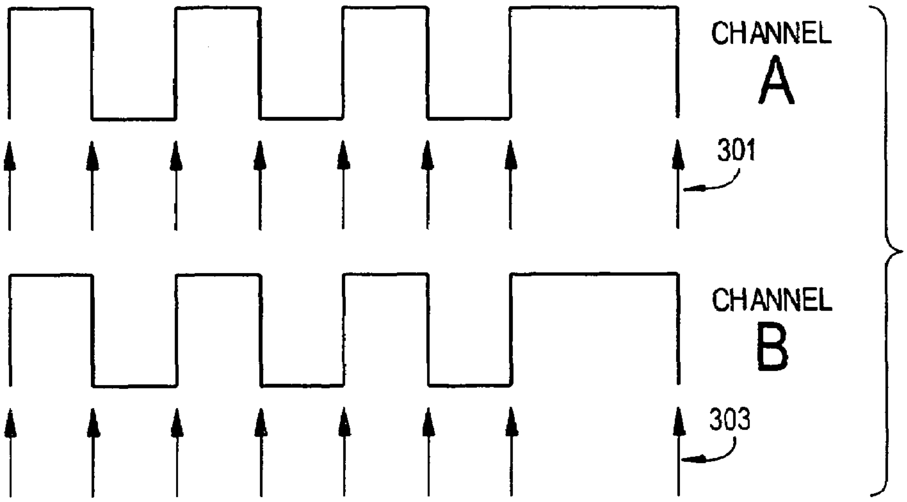
FIG. 3 illustrates an edge detection process according to one embodiment of the decoder of the present invention.

FIG. 3 shows the edge detection feature according to one embodiment of the present invention. Edge detection may be performed on each channel for incoming data. For example, FIG. 3 shows edge detection for channel A and channel B. The output of the edge detectors for the data on channels A and B is indicated by the impulse trains 301 and 303 in FIG. 3. Each impulse represents a transition in voltage level.

Figure 4:
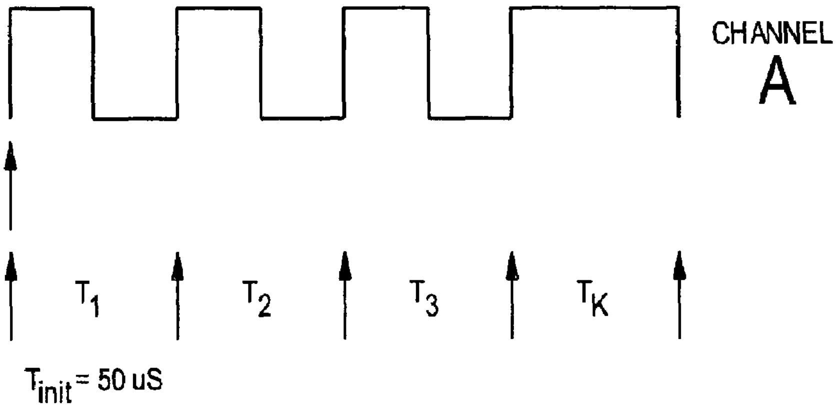
FIGS. 4-5 illustrate an edge prediction process according to one embodiment of the decoder of the present invention.

FIG. 4 illustrates the edge prediction feature according to one embodiment of the present invention. The decoder detects the edge of the first bit (indicated by the two arrows 401 and 403). The period is measured for each incoming data symbol ($T_{k-3}$, $T_{k-2}$, $T_{k-1}$, . . . $T_k$). In the figure $T_{k-3}$, $T_{k-2}$, and $T_{k-1}$ represent the value of zero, and $T_k$ represents a one. These symbols are bi-phase zero representations. The value for the initial symbol period ($T_{init}$) can be assumed (for example 50 μs).

Figure 5:
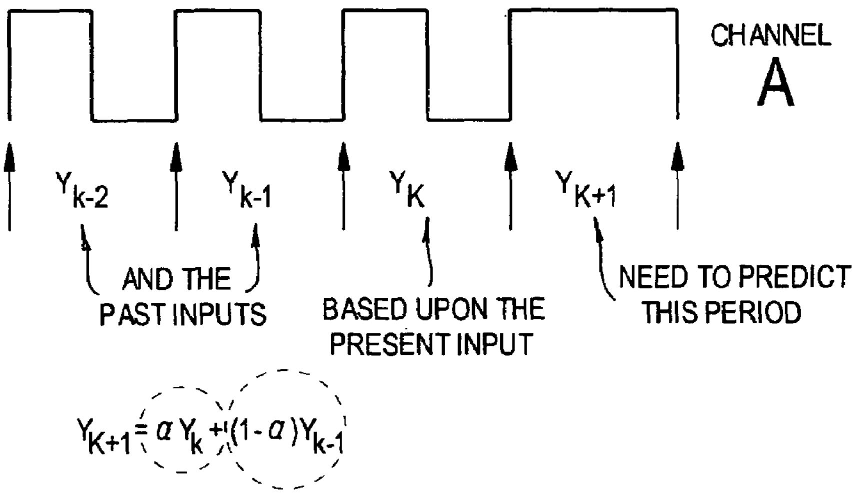

FIG. 5 continues to illustrate the edge prediction process. The periods of previous symbols are used to predict a period of a next pulse. A first order low pass filtered may be used to predict the next symbol period according to the formula:

$$Y_k=\alpha U_k+(1-\alpha)Y_{k-1}$$

In this equation the present output $Y_k$ is a function of the past output period ($Y_{k-1}$) and present input period $U_k$. The $Y_k$ may be defined as weighted average period of the present and past inputs. The last output $Y_{k-1}$ can be used to compare between the present input periods $U_a$ and $U_b$ (for channels A and B respectively) using the following logic:

If $|Y_{k-1}-U_{ak}|<|Y_{k-1}-U_{bk}|$, then $$Y_k=\alpha U_{ak}+(1-\alpha)Y_{k-1}$$

Else, $$Y_k=\alpha U_{bk}+(1-\alpha)Y_{k-1}$$

The present input period $U_{ak}$ or $U_{bk}$ is chosen based upon which input has a period closest to the last weighted average $Y_{k-1}$. The input period $U_{ak}$ or $U_{bk}$ that is closest is utilized to compute the present weighted average $Y_k$. That new output is now utilized to predict the best period for the next symbols received.

The value of α is a filter design parameter. For α greater than 0.5, a high pass filter is formed by providing more weigh to present inputs. For α less than 0.5, a low pass filter is formed by providing more weight to past inputs. For α equal to 0.5, the new output is the average of the present input and the last output. The benefit of altering α includes adapting the predicted period to the frequency (or period) of the incoming data. In many RFID applications the tags producing the IF modulation data have very inaccurate frequency references due to their low cost and low power. The decoder therefore compensates for these inaccuracies by tracking the frequency (or period) of the incoming data (symbol stream) and compensating for those changes. The α may be set as a constant value determined at design time. The application of linear prediction where a third channel is used to choose between two incoming channels is a novel aspect of the present invention. The value of α depends on whether the design engineer trusts the accuracy of the new data (i.e., designs a high pass filter, giving more weight to the future data); or the old data (i.e., designs a low pass filter, giving more weight to the past data).

Figure 6:
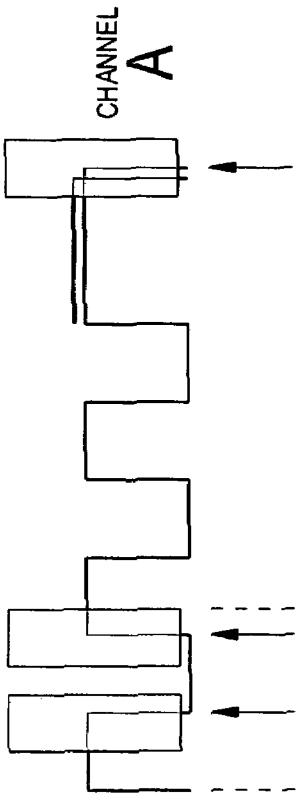
FIG. 6 illustrates a valid symbol verification according to one embodiment of the decoder of the present invention.

FIG. 6 illustrates the valid symbol verification feature of the present invention. In one embodiment of the present invention the decoder determines the validity of incoming symbols. A clock counter may be started at the beginning of the first edge of the first bit. After a predicted maximum symbol period has elapsed, pattern matching is conducted on the received symbol.

FIG. 6 illustrates transitions for both a valid zero and a valid one. Boxes 601, 603, and 605 may be characterized as detection time windows and they indicate valid regions. For a valid zero symbol, only two transitions are allowed and they must be within the predicted time regions (indicated, for example, by the width 607 of boxes 601 and 603 in the figure). A valid "one" may only have one edge transition within the valid time region. In the event that more than two transitions are detected, or less than one transition is detected, the detected symbol is considered to be invalid on that channel.

Figure 7:
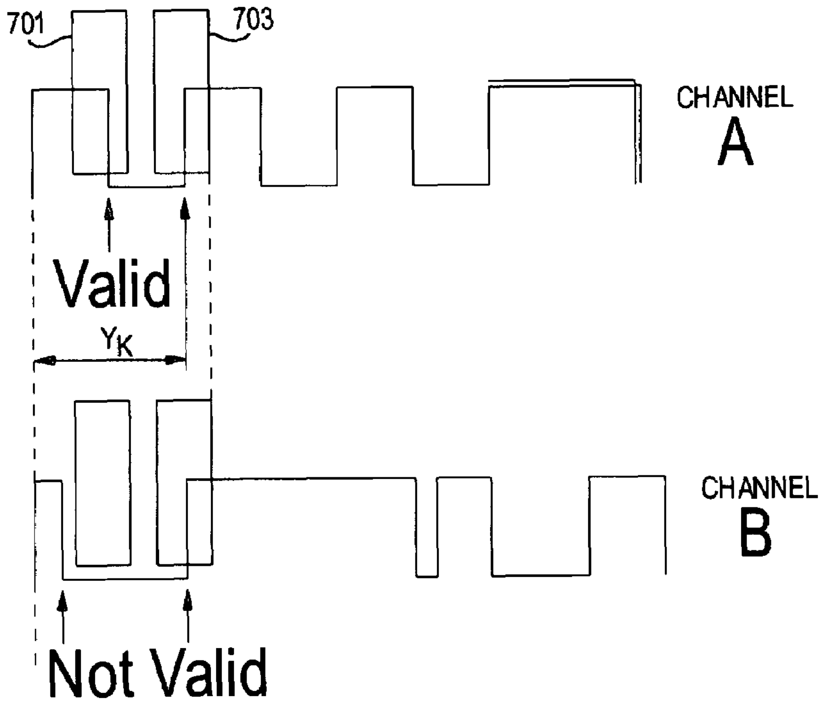
FIGS. 7-8 illustrate channel selection according to one embodiment of the decoder of the present invention.

FIG. 7 illustrates the process of best channel selection for the best of two-channel decoder. In this case channel A is selected because the symbol pattern has two edge transitions in the expected time slots (noted by boxes 701 and 703). The edge transitions on channel B are not where they are expected (or predicted) and therefore the channel has invalid or corrupted data. In other words if channel A has a valid symbol pattern and the channel B symbol pattern is not valid, then the symbol period measured on Channel A is used as the present input for the measured period $Y_k$.

Figure 8:
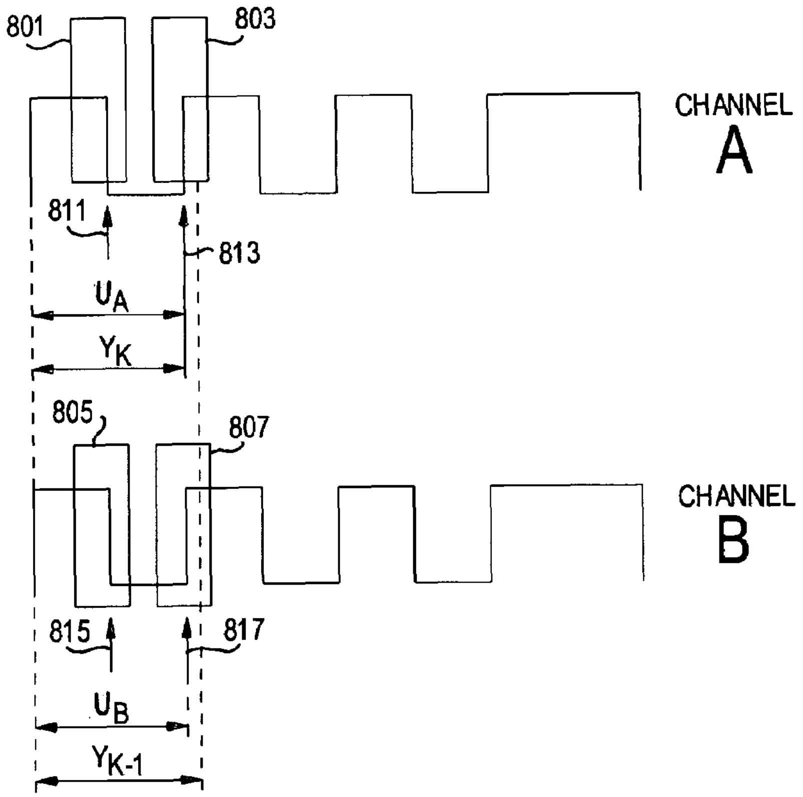

FIG. 8 illustrates the process of best channel selection for the situation where there are only two channels of data being received and both channels A and B have valid data. In the figure, the boxes 801 and 803 clearly match the level transitions 811 and 813 of a valid "zero" data symbol on channel A. Likewise, boxes 805 and 807 match the transitions 815 and 817, verifying that the "zero" data symbol on channel B is valid.

In that situation the previously predicted period $Y_{k-1}$ is compared to the present periods $U_a$ and $U_b$. The channel having a symbol period closest to the predicted symbol period is the best choice and the symbol in that channel is selected as the decoded data symbol. In FIG. 8, channel A is the best channel (i.e., $U_a$ is the closest present symbol period to $Y_{k-1}$) and its symbol period is used to calculate the present output $Y_k$. $Y_k$ constitutes the best period predicted for the next symbols received.

While this invention has been described in conjunction with the specific embodiments outlined above, it is evident that many alternatives, modifications and variations are apparent to those skilled in the art. For example, the descriptions above refer to a two-channel decoder receiving bi-phase data, but the teachings of the invention apply to other types of symbols and/or data which may have two or more edge transitions; some of which may occur in all symbol types and some of which only occurs for specific symbol types. Further, the invention is not limited to a two-channel decoder. Accordingly, the preferred embodiments of the invention as set forth above are intended to be illustrative and not limiting. Various changes may be made without departing from the spirit and scope of the invention.

What is claimed is:

1. A method for decoding data comprising:

receiving data symbols on first and second channels;

detecting data symbol level transitions for each channel;

predicting a period of a next pulse;

verifying the validity of data symbols on each channel; and selecting the best data symbol from one of the two channels.

2. The method of claim 1, wherein the step of predicting a future level transition comprises predicting the time period of a future data symbol by using known periods of previously selected symbols.

3. The method of claim 1, wherein the step of verifying symbol validity is conducted by pattern matching the symbols received on each channel with a known symbol pattern.

4. The method of claim 1, wherein the step of selecting the best data symbol comprises:

measuring the symbol period of each received valid symbol;

comparing the measured period with a predicted period; and choosing the channel carrying the symbol with a symbol period closest to the predicted period.

5. The method of claim 1, wherein the step of selecting the best data symbol comprises:

applying least squares time pattern recognition in selecting the best data symbol based on where level transitions are expected to occur.

6. The method of claim 4, wherein the step of choosing the best data symbol comprises selecting a data symbol having a minimum distance to a predicted symbol period.

7. The method of claim 1, further comprising:

weighing in information from the channel having the best data symbol with stored data topredict a next symbol period.

8. The method of claim 7, wherein the step of weighing in information comprises:

predicting the next symbol period according to the formula:

$$Y_k = \alpha U_k + (1-\alpha) Y_{k-1}$$

wherein $Y_k$ is a present output used as a next predicted symbol period, the $Y_k$ being a weighted average period of present and past inputs;

$Y_{k-1}$ is a past output used as the predicted present symbol period, $Y_{k-1}$ being a last weighted average;

α is a filter weigh factor; and $U_k$ is present input symbol period.

9. The method of claim 8, wherein the output $Y_{k-1}$ is used to compare between present input periods $U_a$ and $U_b$, corresponding to the first and second channels, using the following logic:

If $|Y_{k-1}-U_{ak}|<|Y_{k-1}-U_{bk}|$, then $$Y_k=\alpha U_{ak}+(1-\alpha)Y_{k-1}$$

Else, $$Y_k=\alpha U_{bk}+(1-\alpha)Y_{k-1}$$

wherein the present input period $U_{ak}$ or $U_{bk}$ is chosen based upon which of the two has a period closest to the last weighted average $Y_{k-1}$, the input period $U_{ak}$ or $U_{bk}$ that is closest is chosen as the $U_k$ to compute the present weighted average $Y_k$.

10. The method of claim 1, wherein the step of verifying the validity of data symbols comprises:

establishing a detection time window;

determining a valid zero symbol when a first number of level transitions are detected during that time window; and determining a valid one symbol when a second number of level transitions are detected during that time window.

11. The method of claim 10, wherein the first number of transitions is two.

12. The method of claim 10, wherein the second number of transitions is one.

* * * * *